US008287808B2

(12) United States Patent
Krupenkin et al.

(10) Patent No.: US 8,287,808 B2
(45) Date of Patent: Oct. 16, 2012

(54) SURFACE FOR REVERSIBLE WETTING-DEWETTING

(75) Inventors: Thomas Nikita Krupenkin, Warren, NJ (US); Joseph Ashley Taylor, Springfield, NJ (US)

(73) Assignee: Alcatel Lucent, Paris (FR)

( * ) Notice: Subject to any disclaimer, the term of this patent is extended or adjusted under 35 U.S.C. 154(b) by 1155 days.

(21) Appl. No.: 11/227,663

(22) Filed: Sep. 15, 2005

(65) Prior Publication Data

US 2007/0059510 A1 Mar. 15, 2007

(51) Int. Cl.
*G01N 15/06* (2006.01)

(52) U.S. Cl. .......................... 422/68.1; 422/50; 422/408

(58) Field of Classification Search .......... 422/100–102; 423/219
See application file for complete search history.

(56) References Cited

U.S. PATENT DOCUMENTS

| | | | |
|---|---|---|---|
| 3,454,686 A | 7/1969 | Jones | |
| 3,670,130 A | 6/1972 | Greenwood | |
| 4,030,813 A | 6/1977 | Kohashi et al. | |
| 4,118,270 A | 10/1978 | Pan et al. | |
| 4,137,060 A | 1/1979 | Timmermann | |
| 4,338,352 A | 7/1982 | Bear et al. | |
| 4,406,732 A | 9/1983 | Kayoun | |
| 4,569,575 A | 2/1986 | Le Pesant et al. | |
| 4,653,847 A | 3/1987 | Berg et al. | |
| 4,671,609 A | 6/1987 | Khoe et al. | |
| 4,708,426 A | 11/1987 | Khoe et al. | |
| 4,783,155 A | 11/1988 | Imataki et al. | |
| 4,784,479 A | 11/1988 | Ikemori | |
| 4,867,521 A | 9/1989 | Mallinson | |
| 4,948,214 A | 8/1990 | Hamblen | |
| 5,248,734 A | 9/1993 | Ober et al. | |
| 5,348,687 A | 9/1994 | Beck et al. | |
| 5,412,746 A | 5/1995 | Rossberg et al. | |
| 5,428,711 A | 6/1995 | Akiyama et al. | |
| 5,486,337 A | 1/1996 | Ohkawa | |
| 5,518,863 A | 5/1996 | Pawluczyk | |
| 5,659,330 A | 8/1997 | Sheridon | |
| 5,665,527 A | 9/1997 | Allen et al. | |
| 5,922,299 A | 7/1999 | Bruinsma et al. | |
| 5,948,470 A | 9/1999 | Harrison et al. | |
| 6,014,259 A | 1/2000 | Wohlstadter | |
| 6,027,666 A | 2/2000 | Ozin et al. | |
| 6,156,283 A * | 12/2000 | Allen et al. | 423/219 |

(Continued)

FOREIGN PATENT DOCUMENTS

DE 19623270 A 1/1998

(Continued)

OTHER PUBLICATIONS

Mugele et al. "Electrowetting: from basics to applications". J.Phys. :Condens. Matter. 2005. vol. 17, pp. R705-R774.*

(Continued)

*Primary Examiner* — Yelena G. Gakh
*Assistant Examiner* — David Weisz
(74) *Attorney, Agent, or Firm* — Hitt Gaines, PC

(57) ABSTRACT

An apparatus comprising a plurality of closed-cells on a substrate surface. Each of the closed-cells comprise one or more internal walls that divide an interior of each of the closed-cells into a single first zone and a plurality of second zones. The first zone occupies a larger area of the closed-cell than any one of said second zones and the first and second zones are interconnected to form a common volume.

19 Claims, 7 Drawing Sheets

U.S. PATENT DOCUMENTS

| | | | | |
|---|---|---|---|---|
| 6,185,961 | B1 | 2/2001 | Tonucci et al. | |
| 6,319,427 | B1 | 11/2001 | Ozin et al. | |
| 6,329,070 | B1 | 12/2001 | Sass et al. | |
| 6,369,954 | B1 | 4/2002 | Berge et al. | |
| 6,379,874 | B1 | 4/2002 | Ober et al. | |
| 6,387,453 | B1 | 5/2002 | Brinker et al. | |
| 6,409,907 | B1 | 6/2002 | Braun et al. | |
| 6,431,695 | B1 * | 8/2002 | Johnston et al. | 347/86 |
| 6,465,387 | B1 | 10/2002 | Pinnavaia et al. | |
| 6,471,761 | B2 | 10/2002 | Fan et al. | |
| 6,473,543 | B2 | 10/2002 | Bartels | |
| 6,538,823 | B2 | 3/2003 | Kroupenkine et al. | |
| 6,545,815 | B2 | 4/2003 | Kroupenkine et al. | |
| 6,545,816 | B1 | 4/2003 | Kroupenkine et al. | |
| 6,891,682 | B2 | 5/2005 | Aizenberg et al. | |
| 7,204,298 | B2 | 4/2007 | Hodes et al. | |
| 2002/0125192 | A1 | 9/2002 | Lopez et al. | |
| 2003/0020915 | A1 | 1/2003 | Schueller et al. | |
| 2003/0148401 | A1 | 8/2003 | Agrawal et al. | |
| 2004/0058450 | A1 | 3/2004 | Pamula et al. | |
| 2004/0191127 | A1 | 9/2004 | Kornblit et al. | |
| 2005/0039661 | A1 | 2/2005 | Kornblit et al. | |
| 2005/0042766 | A1 * | 2/2005 | Ohman et al. | 436/174 |
| 2005/0069458 | A1 | 3/2005 | Hodes et al. | |
| 2006/0172189 | A1 | 8/2006 | Kolodner et al. | |
| 2007/0048858 | A1 | 3/2007 | Aizenberg et al. | |
| 2007/0056853 | A1 | 3/2007 | Aizenberg et al. | |
| 2007/0059213 | A1 | 3/2007 | Aizenberg et al. | |
| 2007/0059489 | A1 | 3/2007 | Hodes et al. | |
| 2007/0237025 | A1 | 10/2007 | Krupenkin et al. | |
| 2007/0272528 | A1 | 11/2007 | Gasparyan et al. | |

FOREIGN PATENT DOCUMENTS

| | | | |
|---|---|---|---|
| DE | 197 04 207 | A1 | 8/1998 |
| EP | 0 290 125 | | 11/1988 |
| EP | DE 197 05 910 | | 6/1998 |
| EP | 1120164 | | 8/2001 |
| FR | 2769375 | | 4/1999 |
| WO | WO 99/18456 | | 4/1999 |
| WO | WO 99/54730 | | 10/1999 |
| WO | WO 01/31404 | A1 | 5/2001 |
| WO | WO 01/42540 | | 6/2001 |
| WO | WO 01/51990 | | 7/2001 |
| WO | WO 03/056330 | | 7/2003 |
| WO | WO 03/071335 | | 8/2003 |
| WO | WO 03/083447 | | 10/2003 |
| WO | WO 03/103835 | | 12/2003 |

OTHER PUBLICATIONS

U.S. Appl. No. 10/040,017, filed Jan. 4, 2002, Megens et al.
U.S. Appl. No. 10/094,093, filed Mar. 8, 2002, Eggleton et al.
U.S. Appl. No. 10/096,199, filed Mar. 12, 2002, Chandross et al.
U.S. Appl. No. 10/098,286, filed Mar. 15, 2002, Chen et al.
U.S. Appl. No. 10/135,973, filed Apr. 30, 2002, Z Bao et al.
U.S. Appl. No. 10/139,124, filed May 3, 2002, Kroupenkine et al.
U.S. Appl. No. 10/231,614, filed Aug. 30, 2002, Kroupenkine et al.
U.S. Appl. No. 10/321,027, filed Dec. 17, 2002, Reichmanis et al.
U.S. Appl. No. 10/383,150, filed Mar. 6, 2003, Chen et al.
U.S. Appl. No. 10/402,046, filed Mar. 28, 2003, Aizenberg et al.
U.S. Appl. No. 10/403,159, filed Mar. 31, 2003, Kornblit et al.
U.S. Appl. No. 10/631,996, filed Jul. 31, 2003, Aizenberg et al.
U.S. Appl. No. 10/637,837, filed Aug. 8, 2003, David et al.
U.S. Appl. No. 10/649,285, filed Aug. 27, 2003, Kornblit et al.
U.S. Appl. No. 10/674,448, filed Sep. 30, 2003, Hodes et al.
U.S. Appl. No. 10/716,084, filed Nov. 18, 2003, Kroupenkine et al.
U.S. Appl. No. 10/798,064, filed Mar. 11, 2004, Amey et al.
U.S. Appl. No. 10/803,565, filed Mar. 18, 2004, Hodes et al.
U.S. Appl. No. 10/803,576, filed Mar. 18, 2004, Kroupenkine et al.
U.S. Appl. No. 10/803,641, filed Mar. 18, 2004, Hodes et al.
U.S. Appl. No. 10/806,543, filed Mar. 23, 2004, Amey et al.
U.S. Appl. No. 10/810,774, filed Mar. 26, 2004, Krouopenkine et al.
U.S. Appl. No. 10/816,569, filed Apr. 1, 2004, Gasparyan et al.
Washizu, Masao, "Electrostatic Actuation of Liquid Droplets for Microreactor Applications," IEEE Transactions on Industry Applications, vol. 34, No. 4, Jul./Aug. 1998, pp. 732-737.
Schilling, Andreas et al., Surface Profiles of Reflow Microlenses Under the Influence of Surface Tension and Gravity, Opt. Eng. (39(8) pp. 2171-2176, Society of Photo-Optical Instrumentation Engineers, Aug. 2000.
Danzerbrink, R. et al., "Deposition of Micropatterned Coating Using an Ink-Jet Technique," Thin Solid Films 351, pp. 115-118, Elsevier Science S.A. (1999).
Feng, Chuan Liang et al., "Reversible Wettability of Photoresponsive Flourine-Containing Azobenzene Polymer in Langmuir-Blodgett Films," Lengmuir vol. 17, No. 15, 2001, pp. 4593-4597, American Chemical Society published on Web Jun. 22, 2001.
Ichimura, Kunihiro et al., "Light-Driven Motion of Liquids on a Photoresponsive Surface." Science. vol. 288. Jun. 2, 2000. pp. 1624-1626.
Commander, L.G. et al., "Variable Focal Length Microlenses," Optics Communications 177. Apr. 15, 2000. pp. 157-170.
Aizenberg, J., et al., "Calcitic microlenses as part of the photoreceptor system in brittlestars," Nature, vol. 412, pp. 819-822, Aug. 23, 2001.
English language translation of abstract for German Patent Document: DE 19623270 from European Patent Office database, esp@cenet.com, (1998), 1 page.
Tuberfield, A.J., "Photonic Crystals Made by Holographic Lithography," MRS. Bulletin, Aug. 2001, pp. 632-636.
Campbell, M., et al., "Fabrication of Photonic Crystals for The Visible Spectrum by Holographic Lithography," Nature, vol. 404, Mar. 2, 2000, pp. 53-56.
Ho, K.M., et al., "Existence of a Photonic Gap in Periodic Dielectric Structures," Physical Review Letters, vol. 65, No. 25, Dec. 17, 1990, pp. 3152-3155.
Ozbay, E., et al., "Measurement of a Three-Dimensional Photonic Band Gap in a Crystal Structure Made of Dielectric Rods," Physical Review B, vol. 50, No. 3, Jul. 15, 1994, pp. 1945-1948.
Tuberfield, A., "Photonic Crystals Made by Holographic Lithography," ABSTRACT from Symposium K, Microphotonics-Materials, Phyisics, and Applications, Nov. 26-29, 2001, 1 page.
Shoji, S., et al., "Photofabrication of Three-Dimensional Photonic Crystals by Multibeam Laser Interference Into a Photopolymarizable Resin," Applied Physics Letters, vol. 76, No. 19, May 8, 2000, pp. 2668-2670.
Sundararajan, N., et al., "Supercritical CO2 Processing for Submicron Imaging of Fluoropolymers," Chemistry of Materials, vol. 12, No. 1, Jan. 2000, pp. 41-48.
Kresge, C.T., et al: "Ordered mesoporous molecular sievas synthesized by a liquid-crystal template mechanism" Nature, vol. 359, Oct. 1992, pp. 710-712.
Taney, Peter T., et al: "A Neutral Templating Route to Mesaporous Molecular Sieves," SCIENCE, vol. 267, Feb. 1995. pp. 855-867.
Huo, Q. et al: "Generalized synthesis of periodic surfactant/inorganic composite materials," NATURE, vol. 368. Mar. 1994, pp. 317-321.
Sanchez, C., et al: "Design and Properties of Hybrid Organic-Inorganic Nanocomposites for Photonics," MRS Bulletin, May. 2001, pp. 377-387.
Yang, P., et al: "Hierarchically Ordered Oxides," Science, vol. 282, Dec. 1998, pp. 2244-2246. Templin, M. et al: "Organically Modified Aluminosilicate Mesostructures from Block Copolymer Phases," Science vol. 278 Dec. 1997 pp. 1795-1798.
Raman, N.K., et al: "Template-Based Approaches to the Preparation of Amorphous, Nanoporous Silicas," Chemical Matter, vol. 8, Feb. 1996, pp. 1682-1701.
Yang, P., et al: "Block Copolymer Templating Synthesis of Mesoporous Metal Oxides with Large Ordering Lengths and Semicrystalline Framework," Chemical Matter, vol. 11, 1999, pp. 2813-2826.
Brinker, C.J., et al., "Evaporation-Induced Self-Assembly: Nanostructures Made Easy**" Advanced Materials. vol. 11. 1999. pp. 579-585.
Lee, Y-J., Braun, P.V., "Tunable Inverse Opal Hydrogel pH Sensors," Adv. Mater. 2003, 15, No. 7-8, Apr. 17, 2003. pp. 563-566.
Arsenault, A.C., et al., "A Polychromic, Fast Response Metallopolymer Gel Photonic Crystal with Solvant and Redox Tunability: A Step Towards Photonic Ink (P-Ink)," Adv. Mater. 2003, 15, No. 6, Mar. 17, 2003, pp. 503-507.

Zhang, S., et al., "Materials and techniques for electrochemical biosensor design and construction," Biosensors & Bioelectronics 15, (2000), pp. 273-282.
Wu, H., et al., "Reduction Photolithography Using Microlens Arrays: Applications in Gray Scale Photolithography," Analytical Chemistry, vol. 74, No. 14, Jul. 15, 2002, pp. 3267-3273.
Leister Microsystems, leaflet by Leister Microsystems entitled, "Micro-optics—Imagine the Future of Light," Sep. 2000, 4 pages.
Stokes, D.L., et al., "Detection of *E. coli* using a microfluidics-based Antibody Biochip detection systems," Fresenius, J. Anal Chem (2001) 369, pp. 295-301.
Jahns, J., et al., "Microoptics for biomedical applications," American Biotechnology Laboratory, No. 18. Oct. 2000, pp. 52 and 54.
Campbell, D.J., et al., "Replication and Compression of Bulk and Surface Structures with Pholydimethylsiloxane Elastomer," Journal of Chemical Education, vol. 75, No. 4, Apr. 1999, pp. 537-541.
Kruk, M., et al., "Mesoporous Silicate-Surfactant Composites with Hydrophobic Surfaces and Tailored Pore Sizes"; Journal of Physical Chemistry 106 B (2002) pp. 10096-10101.
Thrush, E., et al., "Integrated semiconductor fluorescent detection system for biochip and biomedical applications," IEEE-EMBS Special Topic Conference on Microtechnologies in Medicine & Biology, May 2002, pp. 374-379.
Avgeropoulos, et al., "Synthesis and Morphological Behavior of Silicon-Containing Triblock Copolymers for Nanostructure Applications," Chem. Mater. 1998, 10, pp. 2109-2115.
Chan, Vanessa A-H., et al., "Ordered Bicontinuous Nanoporous and Nanorelief Ceramic Films from Self-Assembling Polymer Precursors," Science, Nov. 26, 1999, vol. 286, pp. 1716-1719.
Shishido, A., et al., "Direct fabrication of two-dimensional titania arrays using interference photolithography," Applied Phyisical Letters, vol. 79, No. 20, Nov. 12, 2001, pp. 3332-3334.
Young, "Organic-Inorganic Monomers," accessed at http://www.psrc.usm.edu/mauritz/nano2.html. Jul. 8, 2002.
Yang, et al., "Creating Periodic Three-Dimensional Structures by Multibeam Interference of Visible Laser," Chemistry of Materials, vol. 14, No. 7, Jul. 2002, pp. 2831-2833.
Vlasov et al., "On-Chip Netural Assembly of Silicon Photonic Bandgap Crystals," Nature, vol. 414, Nov. 15, 2001, pp. 289-293.
Baney, et al., "Silsesquioxanes," American Chemical Society, 1995, pp. 1409-1430.
The Wittman Company, "Carbon Dioxide," published online at http://www.witteman.com/co2.htm, Dec. 4, 2002, 2 pages.
"Sol-Gel Chemistry," published online at http://www.sol-gel.com/chemi.htm, Dec. 9, 2002, 2 pages.
Abbot, N.L., et al., "Potential-Dependent Wetting of Aqueous Solutions on Self-Assembled Monolayers Formed from 15-(Ferrocenylcarbonyl) pentadecanethiol on Gold," Langmuir 1994, American Chemical Society vol. 10, pp. 1493-1497.
Abbot, N.L., et al. "Potential-Dependent Wetting of Aqubous Solutions on Self-Assembled Monolayers Formed from 15-(Ferrocenylcarbonyl) Pentadecaneithiol on Gold," Langmuir 1994, American Chemical Society, vol. 10, pp. 1493-1497.
Kim, et al, "Nanostructured Surfaces for Dramatic Reduction of Flow Resistance in Drop[let-Based Microfluidics." IEEE, pp. 479-482 (2002).
E.W. Becker, et al., "Fabrication of microstructures with high aspect ratios and great structural heights by synchrotron radiation lithography, galvanoforming, and plastic moulding (LIGA process)", Microelectronic Engineering Elsevier Publishers BV, Amsterdam, NI, vol. 4, No. 1 (May 1, 1986), pp. 35-56.
Surface Energy Material (dynes/cm), ACCUDYNETE, "Solid Surface Energies," accessed at http://www.accudynetest.com/surface_energy_materials.html, Jul. 27, 2005 (3 pages).
eFunda: General Information on Element Silicon, accessed at http://www.efunda.com/materials/elements/element_info.cfm?Element_ID=Si, Aug. 10, 2005 (8 pages).
Bhardwaj, et al., "Advances in High Rate Silicon and Oxide Etching using ICP", STS Ltd., Imperial Park, Newport, UK NP10 89UJ (6 pags).
Templin, et al., "Organically Modified Aluminosilicate Mesostructrures from block Copolymer Phases", www.sciencemag.org, Science, vol. 278, Dec. 5, 1997, pp. 1795-1798.
Glod, et al., "An investigation of microscale explosive vaporization of water on an utrathin Pt wire", International Journal of Heat and Mass Transfer 45 (2002), pp. 367-379.
Krupenkin, et al.; From rolling ball to complete wetting: the dynamic tuning of liquids on nanostructured surfaces; Langmuir 2004, 20, pp. 3824-3827.
Krupenkin, et al.; From rolling ball to complete wetting: the dynamic tuning of liquids on nanostructured surfaces; Abstract Y22.006; Abstracts, meeting of the American Physical Society in Montreal, Canada, Mar. 22-26, 2004, 4 pages.
Bell Labs scientists discover technique to control fluids using specially fabricated silicon "nanograss"; Lucent Technologies, press release Mar. 12, 2004. 3 Pages (no longer available on Lucent's press archive, but available through the Internet Archive).
Taylor, J. Ashley, et al.; Nanotech Makes Liquids Manageable; Energy Optimization News, May 1, 2004, 1 Page.
Tunable Surfaces; Physics News 678, Mar. 26, 2004 (American Institute of Physics), 2 Pages.
Weiss, Peter; Super-repellent surface switches on and off; Science News, Apr. 24, 2004, vol. 165, Issue 17, p. 270 (2 pages).
Gonsalves, Antone, Bell Labs Invention Could Mean Cooler Chips, Techweb Network, Mar. 12, 2004, 2 Pages.
Chang, Kenneth, 'Nanograss' Turns Sticky to Slippery in an Instant, The New York Times, Mar. 16, 2004, 2 Pages.
Krupenkin, T., et al., Tunable liquid microlens, Applied Physics Letters, vol. 82, No. 3, Jan. 20, 2003, pp. 316-318.
Pamula, Vamsee K., et al., Cooling of Integrated Circuits Using Droplet-Based Microfluidics, Proceedings of the 13th ACM Great Lakes symposium on VLSI, Washington DC, Apr. 28-29, 2003, pp. 84-87 (4 Pages).
Oprins, H., et al., On-Chip Liquid Cooling with Integrated Pump Technology, 21st IEEE Semi-Therm Symposium, San Jose, CA, Mar. 15-16, 2005, 7 Pages.
Krupenkin, Tom, et al., Electrically Tunable Superhydrophobic Nanostructured Surfaces, Bell Labs Technical Journal 10(3), pp. 161-170.

* cited by examiner

SURFACE FOR REVERSIBLE WETTING-DEWETTING

TECHNICAL FIELD OF THE INVENTION

The present invention is directed, in general, to controlling the wettability of a surface.

BACKGROUND OF THE INVENTION

It is desirable to reversibly wet or de-wet a surface, because this would allow one to reversibly control the mobility of a fluid on a surface. Controlling the mobility of a fluid on a surface is advantageous in analytical applications where it is desirable to repeatedly move a fluid to a designated location, immobilize the fluid and remobilize it again. Unfortunately existing surfaces do not provide adequate reversible control of wetting.

For instance, certain surfaces with raised features, such as posts or pins, may provide a superhydrophobic surface. That is, a droplet of liquid on a superhydrophobic surface will appear as a suspended drop having a contact angle of at least about 140 degrees. Applying a voltage between the surface and the droplet can cause the surface to become wetted, as indicated by the suspended drop having a contact angle of less than 90 degrees. Unfortunately, the droplet may not return to its position on top of the structure and with a high contact angle when the voltage is then turned off.

Embodiments of the present invention overcome these deficiencies by providing an apparatus having a surface that can be reversibly wetted and de-wetted, as well as methods of using and manufacturing such an apparatus.

SUMMARY OF THE INVENTION

To address the above-discussed deficiencies, one embodiment of the present invention is an apparatus. The apparatus comprises a plurality of closed-cells on a substrate surface. Each of the closed-cells comprise one or more internal walls that divide an interior of each of the closed-cells into a single first zone and a plurality of second zones. The first zone occupies a larger area of the closed-cell than any one of the second zones and the first and second zones are interconnected to form a common volume.

Another embodiment is a method that comprises reversibly controlling a contact angle of a fluid disposed on a substrate surface. The method comprises placing the fluid on a plurality of the above-described closed-cells of the substrate surface. The method further comprises adjusting a pressure of a medium located inside at least one of the closed-cells, thereby changing the contact angle of the liquid with the substrate surface.

Still another embodiment is a method of manufacture that comprises forming the above-described plurality of closed-cells.

BRIEF DESCRIPTION OF THE DRAWINGS

The invention is best understood from the following detailed description, when read with the accompanying figures. Various features may not be drawn to scale and the scale may be arbitrarily increased or reduced for clarity of discussion. Reference is now made to the following descriptions taken in conjunction with the accompanying drawings, in which.

DETAILED DESCRIPTION

The present invention benefits from an extensive series of investigations into the use of surfaces having closed-cell structures to improve the reversibility of fluid wettability on such surfaces. For the purposes of the present invention, closed-cells are defined as nanostructures or microstructures having walls that enclose an open area on all sides except for the side over which a fluid could be disposed. The term nanostructure as used herein refers to a predefined raised feature on a surface that has at least one dimension that is about 1 micron or less. The term microstructure as used herein refers to a predefined raised feature on a surface that has at least one dimension that is about 1 millimeter or less.

Figure 1:
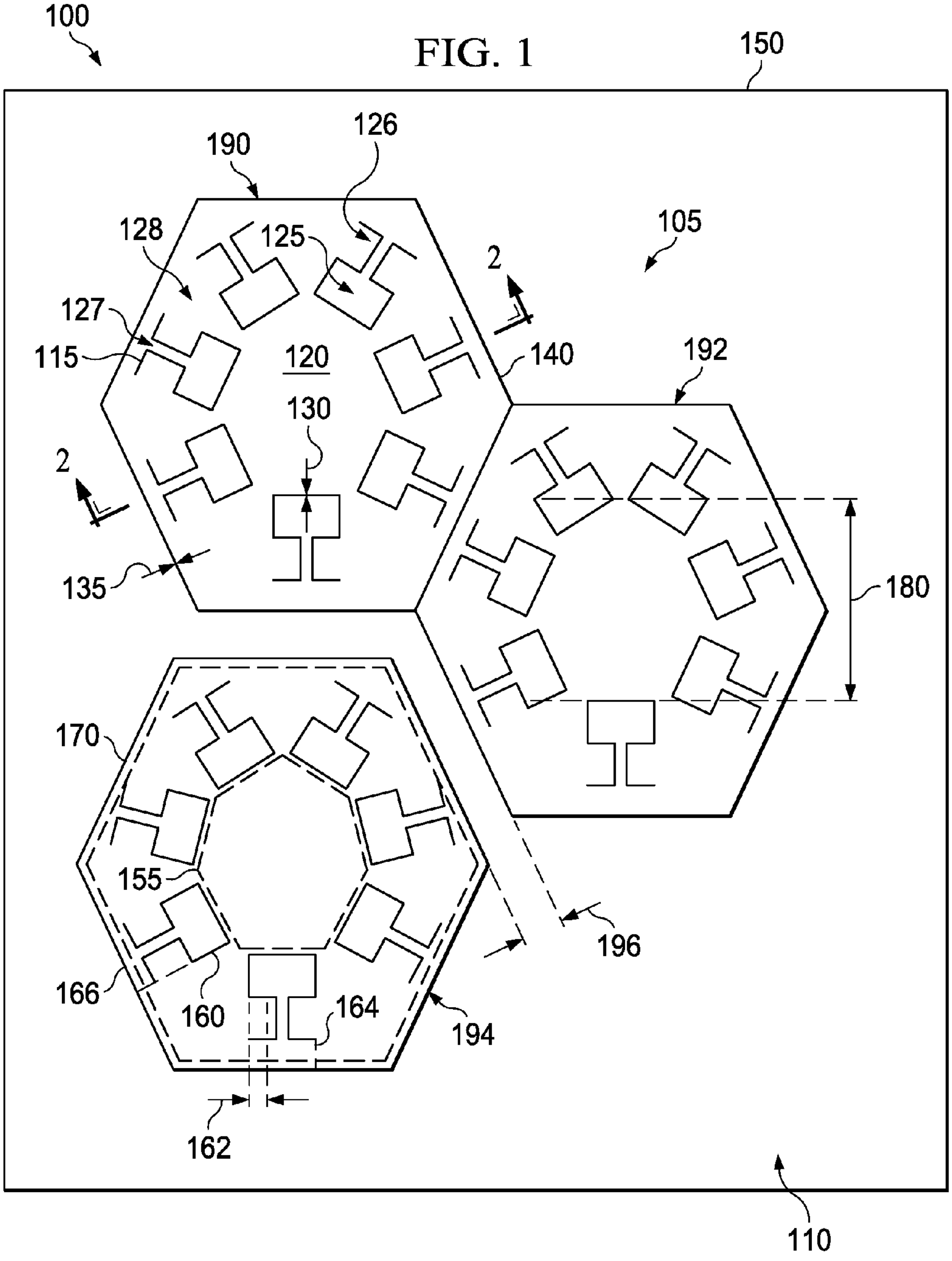
FIG. 1 presents a plan view of an exemplary apparatus to illustrate certain features of the present invention.
Figure 2:
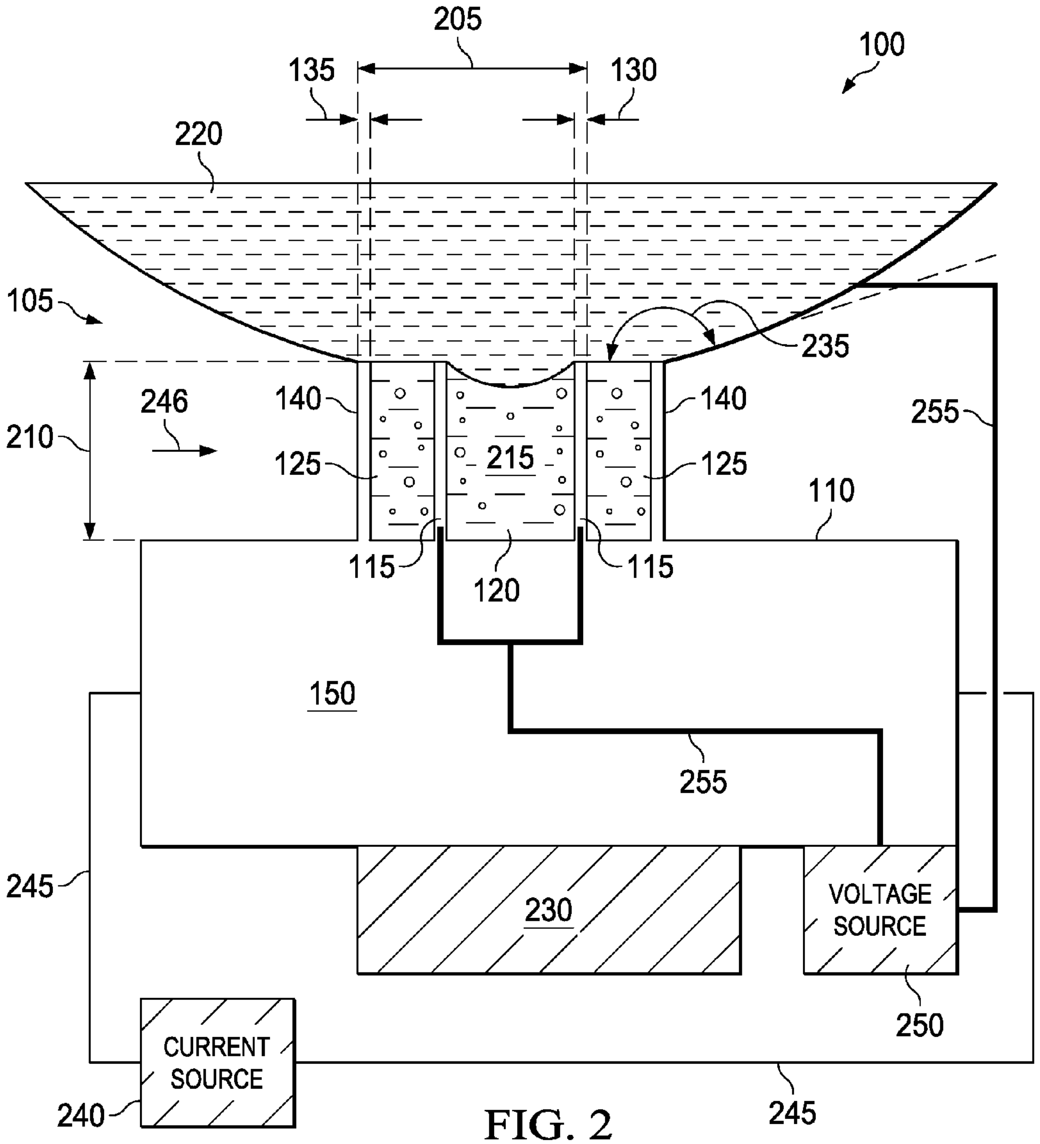
FIG. 2 shows a detailed cross-sectional view of the apparatus depicted in FIG. 1.

One embodiment of the present invention is an apparatus. In some cases, the apparatus is a mobile diagnostic device, such as a lab-on-chip. FIG. 1 presents a plan view of an exemplary apparatus 100 to illustrate certain features of the present invention. FIG. 2 shows a detailed cross-sectional view of the apparatus 100 along view line 2-2, depicted in FIG. 1.

As illustrated in FIG. 1, the apparatus 100 comprises a plurality of closed-cells 105 on a substrate surface 110. Each of the closed-cells 105 comprise one or more internal walls 115 that divide an interior of each of the closed-cells 105 into a single first zone 120 and a plurality of second zones 125, 126, 127, 128. The first zone 120 occupies a larger lateral area of each closed-cell 105 than any one of the second zones 125-128. The first and second zones 120, 125-128 are interconnected to form a common volume.

For the embodiment shown in FIG. 1, each cell 105 prescribes a hexagonal shape in the lateral dimensions of the figure. However other embodiments of the cell 105 can prescribe circular, square, octagonal or other geometric shapes. It is not necessary for each of the closed-cells 105 have shapes and dimensions that are identical to each other, although this is preferred in some embodiments of the apparatus 100.

As noted above, the closed-cells 105 are nanostructures or microstructures. In some embodiments of the apparatus 100, such as illustrated in FIGS. 1 and 2, the one dimension of each closed-cell 105 that is about 1 millimeter or less is a lateral thickness 130 of at least one internal wall 115 of the cell 105. In other embodiments the lateral thickness 130 is less than about 1 micron. In other cases, the one dimension that is about 1 millimeter or less, and in some cases, about 1 micron or less, is a lateral thickness 135 of an external wall 140. In some preferred embodiments of the apparatus 100, the lateral thickness 130 of each internal wall 115 is substantially the same (e.g., within about 10%) as the lateral thickness 135 of the external wall 140.

The closed-cells are located on a substrate 150. In some cases, the substrate 150 is a planar substrate and more preferably, a silicon wafer. In other embodiments, the substrate 150 can comprise a plurality of planar layers made of silicon-on-insulator (SOI) or other types of conventional materials that are suitable for patterning and etching.

As further illustrated in FIG. 2, in some preferred embodiments of the apparatus 100, a lateral width 205 of each closed-cell 105 ranges from about 10 microns to about 1 millimeter. In other embodiments a height 210 of the cells 105 range about 5 microns to about 50 microns. Heights 210 ranging from about 5 microns to about 20 microns are preferred in some embodiments of the closed-cells 105 because walls 115, 140 having such dimensions are then less prone to undercutting during their fabrication.

With continuing reference to FIG. 2, a substrate surface 110 having the closed-cells 105 of the present invention improves the reversibility of fluid expulsion and penetration on the surface 110. The pressure of a medium 215 inside the closed-cell 105 can be increased or decreased by changing the temperature of a substrate 150 that the cells 105 are located on. By increasing or decreasing the pressure, a fluid 220 on the cells 105 can be respectively expelled from or drawn into the cells 105.

The term medium, as used herein, refers to any gas or liquid that is locatable in the closed-cells 105. The term fluid, as used herein, refers to any liquid that is locatable on or in the closed-cells 105. In some preferred embodiments, the medium 215 comprises air and the fluid 220 comprises water.

For a given change in temperature of the closed-cells 105, the extent of expulsion or penetration of fluid 220 will depend upon the volume of medium 215 that can be located in the cell 105. One way to increase the volume of cells 105 is to construct cells 105 with a high aspect-ratio. In some instances, however, it can be technically difficult to construct such high aspect-ratio structures. Referring to FIG. 2, in some cases, where the lateral width 205 is greater than about 2.5 microns, a ratio of cell height 210 to width 205 of greater than about 20:1 can be difficult to attain. For instance, such ratios are hard to attain in a silicon substrate 150 because it is difficult to dry etch the substrate 150 to depths of greater than about 50 microns without undercutting the walls 140 that are formed during the dry etching.

Some embodiments of the present invention circumvent this problem by providing closed-cells 105 with an internal architecture comprising internal walls 115 to provide interconnected zones 120, 125-128. The internal walls 115 are configured so that fluid 220 is drawn in or expelled out of the first zone 120 of the cell 105, but not the plurality of second zones 125-128. Consequently, more easily constructed cells 105 having lower aspect-ratios can be used. For example, in some preferred embodiments of the cells 105, the height 210 to width 205 ratio ranges from about 0.1:1 to about 10:1.

The extent of movement of the fluid 220 in and out of the closed-cell 105 is controlled by the balance between several forces. Particularly important is the balance between the resistive force of medium 215 and fluid 220 surface tension, and the cumulative forces from the pressure of the medium 215 and fluid 220. There is a tendency for the cumulative forces from the pressure of the medium 215 and fluid 220 to dominate the resistive force of surface tension as the perimeter of a cell is increased. The same principles apply to the closed-cells 105 of the present invention, that have the internal architecture of first and second zones 120, 125-128 as described herein. Fluid 220 is less prone to move in and out of the plurality of second zones 125-128 as compared to the first zone 120 because sum of the individual perimeters of the second zones 125-128 is larger than the perimeter of the first zone 120.

For the embodiment illustrated in FIG. 1, the first zone 120 has a perimeter 155 that is defined by one or more internal walls 115. In some cases, where the first zone 120 circumscribes a substantially circular area, the perimeter 155 corresponds to the circumference of the circle. In other cases, such as shown in FIG. 1 the first or second zones 120, 125-128 circumscribe a rectangular, heptagonal or other non-circular distances.

The areas of the second zones 125-128 have perimeters defined by internal 115 or external walls 140, and a rule that the perimeters of second zones 125-128 do not overlap with each other or with the first zone 120. For the embodiment illustrated in FIG. 1, the area of certain types of second zone 125, 126 have perimeters 160, 162 defined by an internal wall 115 that encloses each of the second zones 125, 126 on all but one side. The area of another type of second zone 127 has a perimeter 164 defined by the external wall 140 and portions of one internal wall 115 that enclose the second zone 127 on all but two sides. The area of yet another type of second zone 128 has a perimeter 166 defined by portions of the external wall 140, internal walls 140, and the perimeter 160 of the first zone 120. Of course, the number and types of the perimeters would vary according to the different types of second zones that are formed for a particular combination internal architecture and geometric shape of the closed-cell 105.

In some cases, one of more of the second zones 125, 126 comprises an open cell. The term open cell as used herein refers one or more internal walls 115 that enclose an area on all but one lateral side, and a side over which a fluid could be disposed. In some cases, as depicted in FIG. 1, some of the second zones 125, 126 comprise open cells defined by a single continuous internal wall 115.

As further illustrated in FIG. 1, the area of the first zone 120 is only a portion of a total area of the closed-cell 105, but is still greater than the areas of any one of second zones 125-128. The total lateral area of each closed-cell 105, depicted in FIG. 1, is defined by a perimeter 170 circumscribed by the external wall 140 of each cell 105. The lateral areas of the first 120 and second zones 125-128 are each defined by their respective perimeters 160-166. In some preferred embodiments, such as illustrated in FIG. 1, the area of the first zone 120 is at least about 2 times larger than the area of any one of the second zones 125-128. In other preferred embodiments, the area of the first zone 120 is at least about 10 times larger than the area of any one of the second zones 125-128.

Preferably, at least one lateral dimension of the first zone 120, and all of the second zones 125-128, is constrained to a distance that is less than or equal to a capillary length for a fluid locatable on the cells 105. For the purposes of the present invention, capillary length is defined as the distance between the walls that define the first zone 120 or second zones 125-128 where the force of gravity becomes equal to the surface tension of the fluid located on the cell. Consider, for example, the situation where the fluid is water, and the capillary length for water equals about 2.5 millimeters. In this case, for some embodiments of the closed-cells 105, the one lateral dimension corresponds to a lateral width 180 of the first zone 120, and this width 180 is constrained to about 2.5 millimeters or less.

In some embodiments of the apparatus 100, the plurality of second zones 125-128 are located proximate to the external wall 140 of the closed-cell 105. For instance, for the embodiment shown in FIG. 1, the internal walls 115 are configured to define a first zone 120 that is centrally located in the cell 105. In other cases, however, the first zone 120 can be defined by a combination of internal walls 115 and the external wall 140. In such instances, the first zone 120 can be located proximate to the external wall 140, and at least some of the second zones 125-128 are centrally located.

In certain preferred embodiments of the apparatus 100, the plurality of closed-cells 105 form a network of interconnected cells wherein each closed-cell 105 shares a portion of its external wall 140 with an adjacent cell. For example, as illustrated in FIG. 1, cell 190 shares one side of its wall 140 with cell 192. In other cases, however, at least one, and in some cases all, of the closed-cells 105 are not interconnected. For example, as shown in FIG. 1, cell 194 is separated from adjacent cells 190, 192.

Referring again to FIG. 2, some preferred embodiments of the apparatus 100 further comprise a temperature-regulating device 230. The temperature-regulating device 230 is thermally coupled to the plurality of closed-cells 105. The temperature-regulating device 230 is configured to heat or cool the medium 215 locatable in the closed-cells 105. For example, the device 230 can be configured to contact the substrate 150 so that heat can be efficiently transferred between the device 230 and the cells 105. In some preferred embodiments, the temperature-regulating device 230 can be configured to change a temperature of the medium 215 in the closed-cells 105 from a freezing point to a boiling point of the fluid 220 locatable on the closed-cells 105. For example, when the fluid comprises water, the device 230 can be configured to adjust the temperature of the medium 215 from about 0° to about 100° C. The temperature-regulating device 230 promotes wetting of the surface 110 of the apparatus 105 by decreasing the temperature of the medium 215, or de-wetting by increasing temperature of the medium 215.

For the purposes of the present invention, the surface 110 of the apparatus 100 is wetted if a droplet of the fluid 220 on the surface 110 forms a contact angle 235 of about 90 degrees of less. The surface 110 is de-wetted if the contact angle 235 is greater than or equal to about 140 degrees.

With continuing reference to FIG. 2, other preferred embodiments of the apparatus 100 further comprise an electrical source 240. The electrical source 240 is electrically coupled to the plurality of closed-cells 105 and is configured to apply a current, through wires 245, to the plurality of closed-cells 105, thereby heating the medium 215 locatable in the closed-cells 105. In such instances, the current can flow in a lateral direction 246 along the outer walls 140 of cells 105. The electrical source 240 can thereby promote de-wetting by increasing the temperature of the medium 215. Wetting can be promoted by turning off the current, and allowing the medium 215 to cool. Similar to that discussed above for the temperature-regulating device 230, some preferred embodiments of the electrical source 240 are configured to apply a current that is sufficient to change a temperature of the medium 215 in the closed-cells 105 from a freezing point to a boiling point of the fluid 220 locatable on the closed-cells 105.

Still referring to FIG. 2, in yet other preferred embodiment, the apparatus 100 further comprises a second electrical source 250. The second electrical source 250 is electrically coupled to the plurality of closed-cells 105 and to the fluid 220 locatable on the cells 105. The second electrical source 250 is configured to apply, through wires 255, a voltage (e.g., positive or negative potentials ranging from about 1 to 1000 Volts) between the plurality of closed-cells 105 and the fluid 220. In particular, the voltage is applied only between the liquid 220 and the walls 115 surrounding the first zone 120, but not the plurality of the second zones 125-128. The applied voltage is configured to wet the surface 110 via electro-wetting. Those skilled in the art would be familiar with electro-wetting principle and practices. For example, electro-wetting is discussed in U.S. Pat. No. 6,538,823, which is incorporated by reference in its totality herein. In some preferred embodiments of the apparatus 100, the electrical source 240 for applying the current is the same as the electrical source 250 for applying the voltage.

Figure 3:
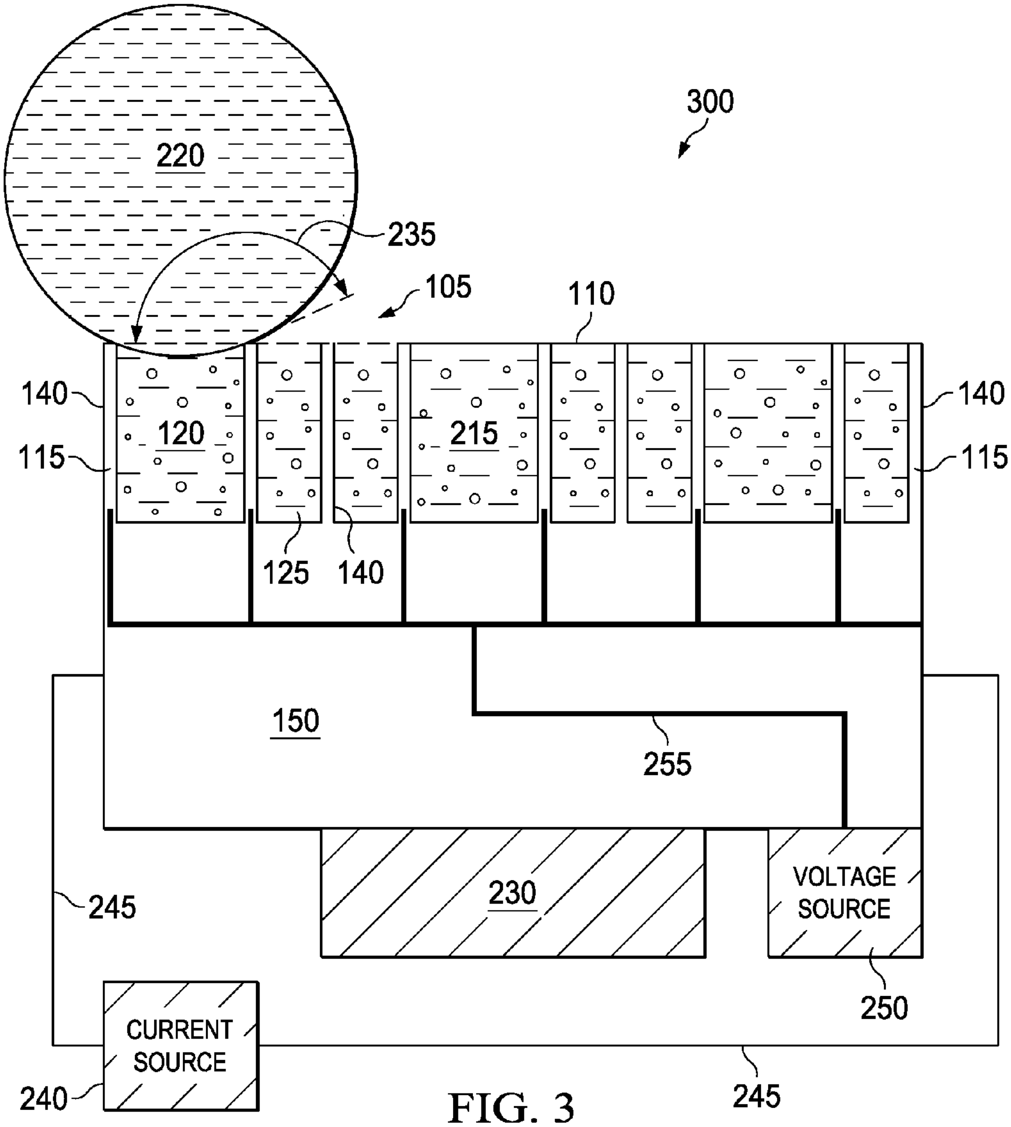
FIGS. 3-5 present cross-sectional views of an exemplary apparatus at various stages of a method of use.
Figure 4:
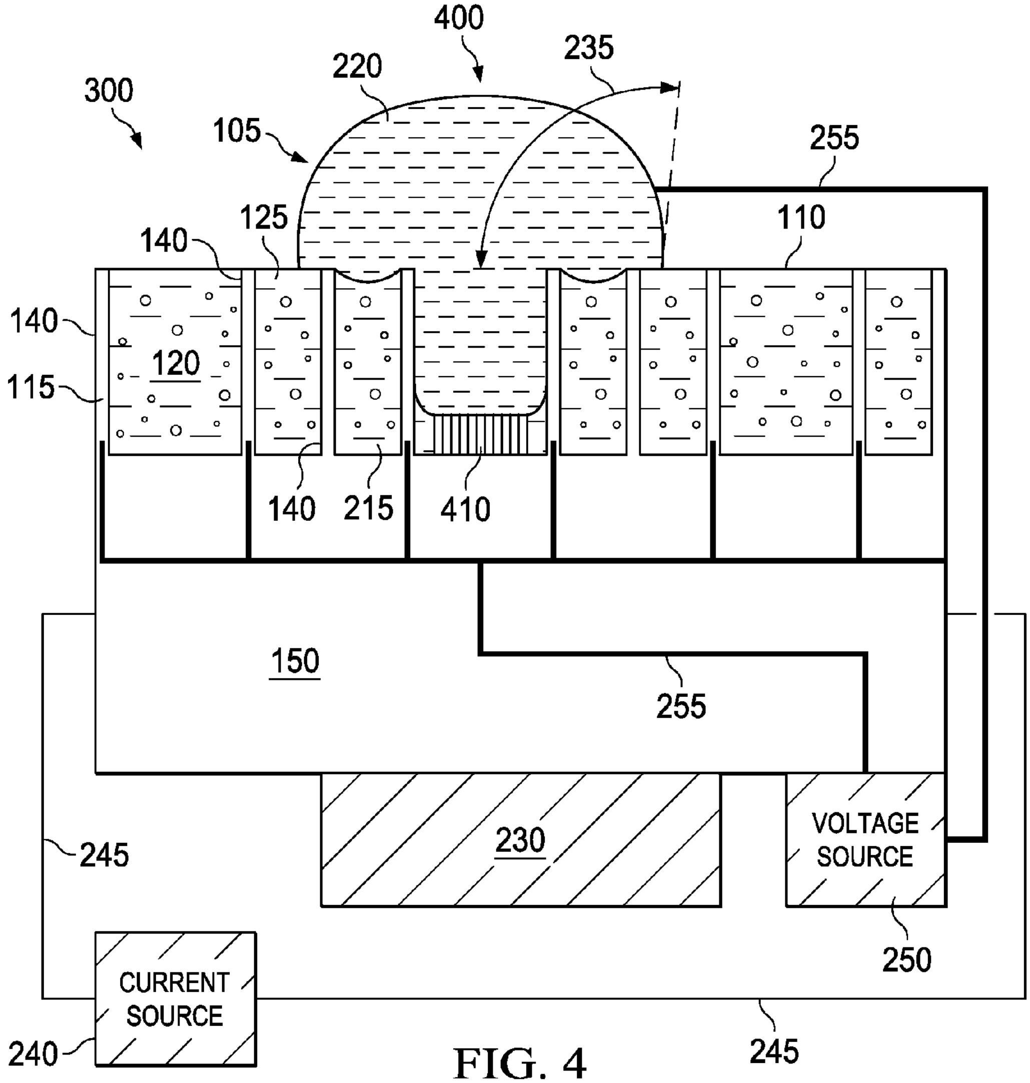
Figure 5:
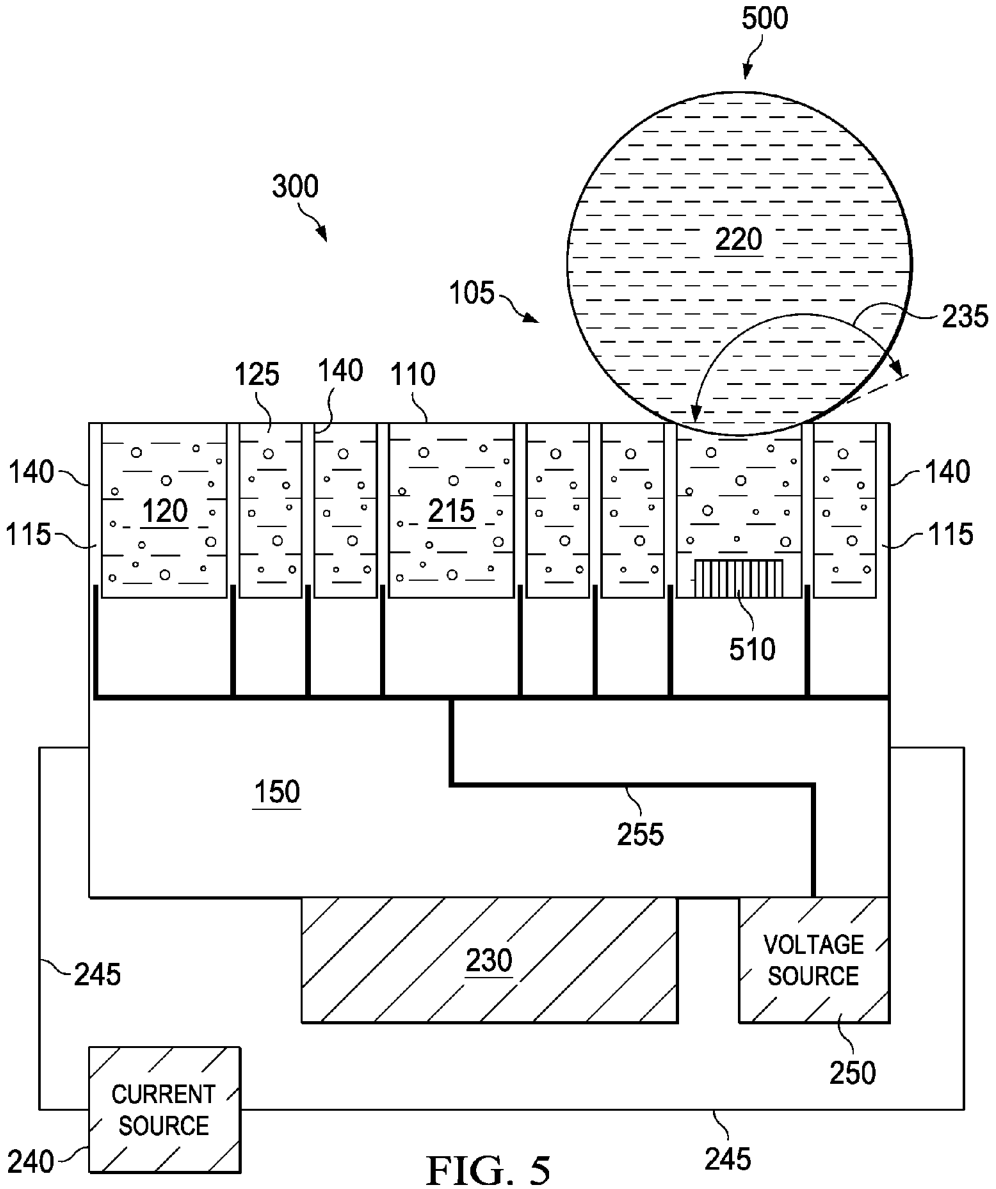

Another aspect of the present invention is a method of use. FIGS. 3-5 present cross-section views of an exemplary apparatus 300 at various stages of a method that includes reversibly controlling a contact angle of a fluid disposed on a substrate surface. The views are analogous to the view presented in FIG. 2, but at a lower magnification. Any of the various embodiments of the present inventions discussed above and illustrated in FIG. 1-2 could be used in the method. FIGS. 3-5 use the same reference numbers to depict analogous structures shown in FIGS. 1-2.

Turning now to FIG. 3, illustrated is the apparatus 300 after placing a fluid 220 on a plurality closed-cells 105 of a substrate surface 110. As discussed above, each of the closed-cells 105 comprise one or more internal walls 115 that divide an interior of each of the closed-cells 105 into a first zone 120 and a plurality of second zones 125. The first zone 120 occupies a larger area of each of the closed-cells 105 than any one second zone 125 and the first and second zones 120, 125 are interconnected to form a common volume.

In some uses of the apparatus 300, it is desirable to reversibly adjust the degree of wetting of the surface 110 that the fluid 220 is disposed on. For example it is advantageous to suspend the fluid 220 on a surface 110 that is de-wetted, so that the fluid 220 can be easily moved over the surface 110. As noted above, the surface 110 is considered de-wetted if a droplet of fluid 220 on the surface 110 forms a contact angle 235 of 140 degrees or greater. In some cases the contact angle 235 of a de-wetted surface 110 is greater than or equal to about 170 degrees.

The degree of wetting of the surface 110 can be reversibly controlled by adjusting a pressure of a medium 215 located inside one or more of the closed-cells 105, thereby changing the contact angle 235 of the fluid 220 with the substrate surface 110. An increase in pressure due to heating the medium 215 can cause the contact angle 235 to increase. Conversely, a decrease in pressure due to cooling the medium 215 can cause the contact angle 235 to decrease. In some preferred embodiments of the method, the contact angle 235 can be reversibly changed. For example, the contact angle 235 can be increased and then decreased, or vice-versa, by at least about 1° per 1 degree Celsius change in a temperature of the medium 215. In other preferred embodiments, the contact angle 235 can be reversibly changed by at least about 50° for an about 50 degree Celsius change in a temperature of the medium 215.

The surface 110 can be de-wetted by increasing the pressure of the medium 215, thereby causing the medium 215 to exert an increased force against the fluid 220. The pressure of the medium 215 can be increased by increasing the medium's temperature, for example, by heating the closed-cells 105 that holds the medium 215. In some cases the cells 105 are heated indirectly by heating the substrate 150 via a temperature-regulating device 230 that is thermally coupled to the substrate 150. In other cases the cells 105 are heated directly by passing a current through the cells 105 via an electrical source 240 that is electrically coupled to the cells 105.

Turning now to FIG. 4, illustrated is the apparatus 300 after moving the droplet of the fluid 220 to a desired location 400, and then wetting the surface so that the fluid 220 becomes immobilized at the desired location 400. Those skilled in the art would be familiar any number of methods that could be used to move the fluid 220. For example, U.S. Patent Application No. 2004/0191127, which is incorporated herein in its totality, discusses methods to control the movement of a liquid on a microstructured or nanostructured surface.

Wetting, as discussed above, is considered to have occurred if a droplet of fluid 220 on the surface 110 forms a contact angle 235 of 90 degrees or less. In some cases, the contact angle 235 of a wetted surface 110 is less than or equal to about 70 degrees. The surface 110 can be wetted by decreasing the pressure of the medium 215, thereby causing the medium 215 to exert less force against the fluid 220. The pressure of the medium 215 can be reduced by decreasing the medium's temperature, for example, by cooling the cells 105 that hold the medium 215. The cells 105 can be cooled indirectly by cooling the substrate 150 via the temperature-regulating device 230. Alternatively, the cells 105 can be cooled directly by turning off or decreasing a current passed through the cells via the electrical source 240. In still other cases, wetting is accomplished by applying a voltage between the cells 105 and the fluid 220 via the electrical source 240, or another electrical source 250, to electro-wet the surface 110.

In some cases, wetting causes the fluid 220 to be drawn into at least one of the closed-cells 105. As illustrated in FIG. 4, the fluid 220 penetrates into the first zone 120 of the closed-cell 105 to a greater extent than the plurality of second zones 125 of the cell 105. In some instances, when the fluid 220 is drawn into the close-cell 105, the fluid 220 contacts an analytical depot 410 located on or in the substrate 150. The analytical depot 410 can comprise any conventional structures or materials to facilitate the identification or characterization of some property of the fluid 220. For example, the analytical depot 410 can comprise a reagent configured to interact with the fluid 410 thereby identifying a property of the fluid 220. As another example, the analytical depot 410 can comprise an field-effect transistor configured to generate an electrical signal when it comes in contact with a particular type of fluid 220 or a compound dissolved or suspended in the fluid 220.

Referring now to FIG. 5, shown is the apparatus 300 after de-wetting the surface 110 so that the fluid 220 is re-mobilized to facilitate the fluid's movement to another location 500 on the surface 110. For example, in some cases, it is desirable to move the fluid 220 to a location 500 over yet another analytical depot 510 and then re-wet the surface 110 so that the fluid 220 contacts the analytical depot 510. Any of the above-described methods can be performed to repeatedly wet and de-wet the fluid 220. Additionally, the above-described methods can be used in combination to increase the extent of wetting or de-wetting, if desired. For instance, the cells 105 that the fluid 220 is located on can be de-wetted through a combination of direct heating, by applying the current, indirect heating, via the temperature-regulating device 230, and turning off the voltage.

Still another aspect of the present invention is a method of manufacturing an apparatus. FIGS. 6-9 present cross-section views of an exemplary apparatus 600 at selected stages of manufacture. The cross-sectional view of the exemplary apparatus 600 corresponds to view line 2-2 in FIG. 1. The same reference numbers are used to depict analogous structures shown in FIGS. 1-5. Any of the above-described embodiments of apparatuses can be manufactured by the method.

Figure 6:
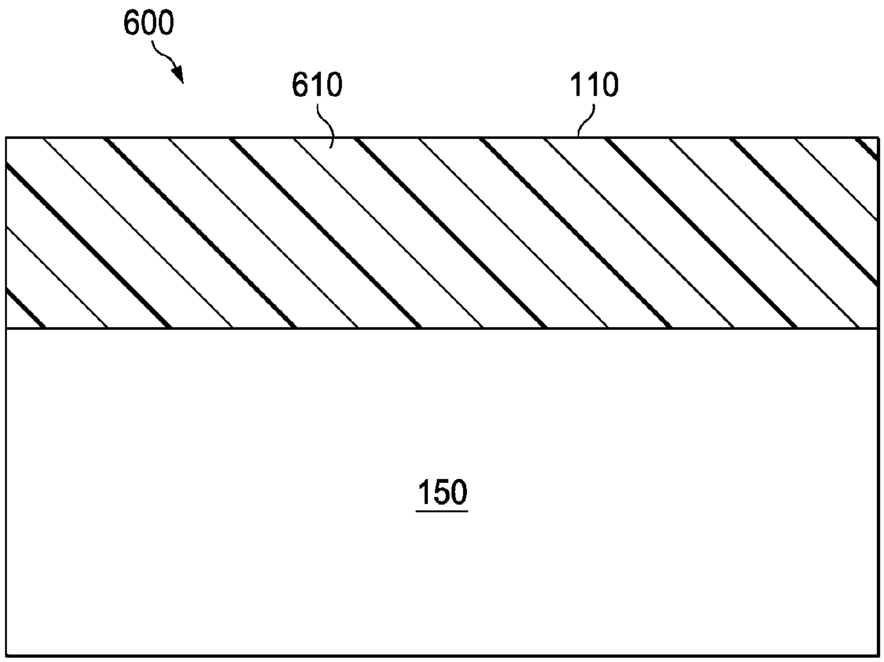
FIGS. 6-9 present cross-sectional views of an exemplary apparatus at selected stages of manufacture.

Turning now to FIG. 6, shown is the partially-completed apparatus 600 after providing a substrate 150 and depositing a photoresist layer 610 on a surface 110 of the substrate 150. Preferred embodiments of the substrate 150 can comprise silicon or silicon-on-insulator (SOI). Any conventional photoresist material designed for use in dry-etch applications may be used to form the photoresist layer 610.

Figure 7:
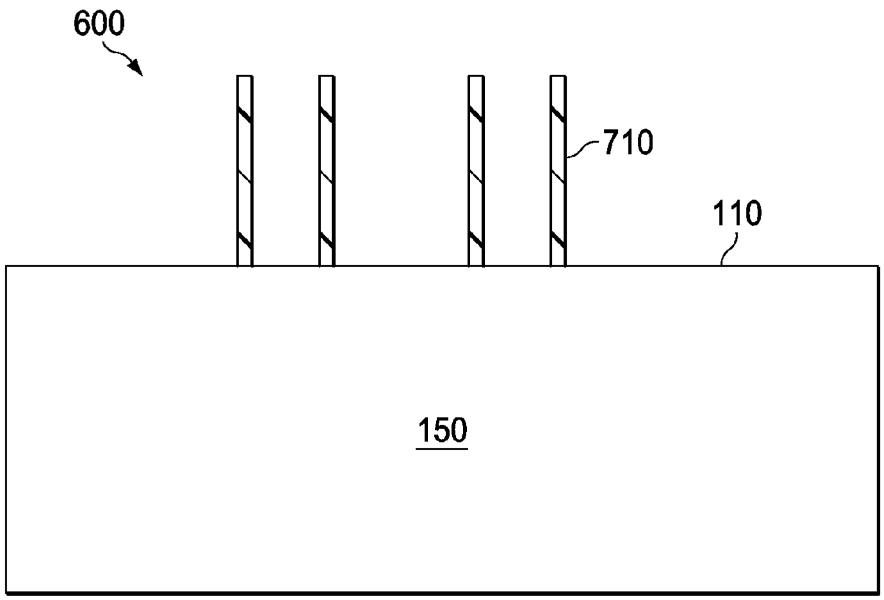

FIG. 7 illustrates the partially-completed apparatus 600 after defining a photoresist pattern 710 in the photoresist layer 610 (FIG. 6) and removing those portions of the layer 610 that lay outside the pattern. The photoresist pattern 710 comprises the layout of internal and external walls for the closed-cells of the apparatus 600.

Figure 8:
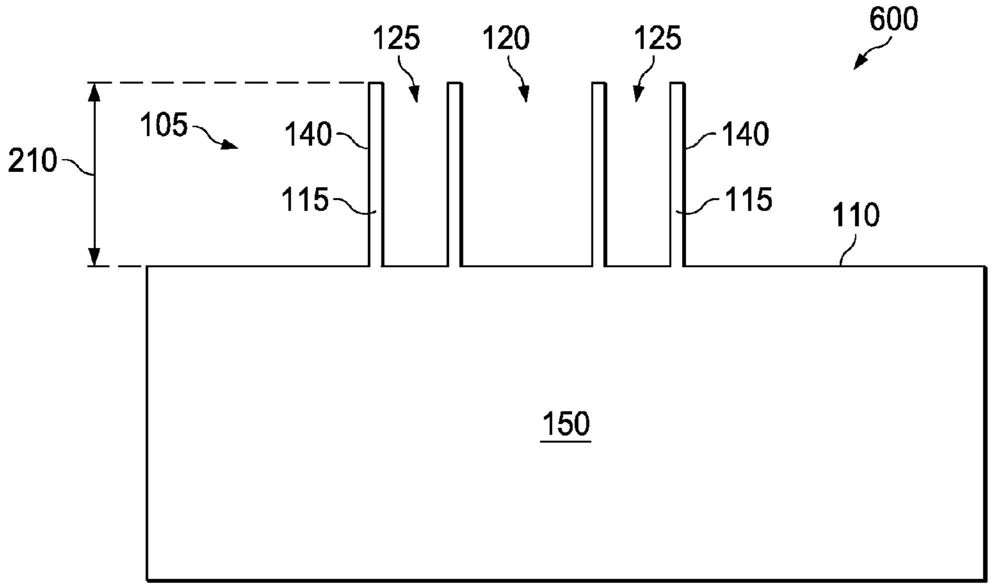

FIG. 8 presents the partially-completed apparatus 600 after forming a plurality of closed-cells 105 on the surface 110 of the substrate 150 and removing the photoresist pattern 710 (FIG. 7). Similar to the apparatuses discussed in the context of FIGS. 1-5, each of the closed-cells 105 comprise one or more internal walls 115 that divide an interior of each of the closed-cells 105 into a single first zone 120 and a plurality of second zones 125. As also discussed above, the first zone 120 occupies a larger area of the closed-cell 105 than any one of the second zones 125 and the first and second zones 120, 125 are interconnected to form a common volume.

In some preferred embodiments, the closed-cells 105 are formed by removing portions of the substrate 150 that are not under the photoresist pattern 710 depicted in FIG. 7 to depths 210 up to about 50 microns. The remaining portions of the substrate 150 comprise internal walls 115 and external walls 140 of the cells 105. In some cases portions of the substrate 150 are removed using conventional dry-etching procedures, for example, deep reactive ion etching, or other procedures well-known to those skilled in the art.

Figure 9:
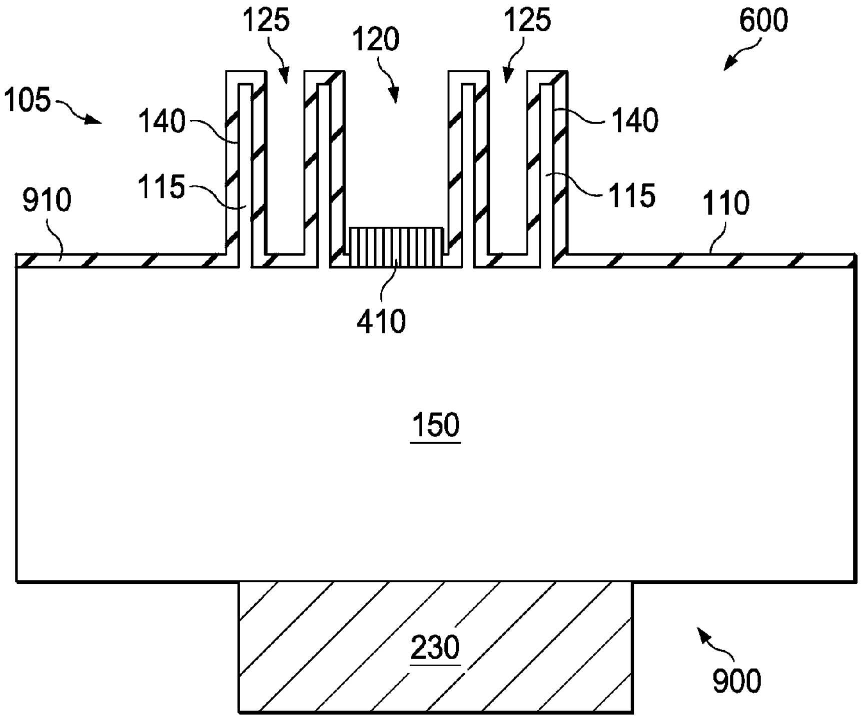

FIG. 9 illustrates the partially-completed apparatus 600 after coupling a temperature-regulating device 230 to the substrate 150. In some cases, the temperature regulating device 230 is coupled to a surface 900 of the substrate 150 that is on the opposite side of the surface 110 that the closed-cells 105 are formed on. In some cases, surface 110, internal walls 115 and external walls 140 of the cells 105 are covered with an insulating layer 910. The insulating layer 910 facilitates the electrowetting of the surface 110, as further discussed in the is discussed in U.S. Pat. No. 6,538,823. In some preferred embodiments, an insulating layer 910 of silicon oxide dielectric is added to the apparatus 600 by thermal oxidation.

FIG. 9 also illustrates the partially-completed apparatus 600 after forming an analytical depot 410 located in the first zone 120. As noted above the analytical depot 410 is configured to interact with a sample deposited on the apparatus 600, thereby identifying a property of fluid 200 deposited on the apparatus 600, such as discussed above in the context of FIGS. 3-5. In some cases, forming the analytical depot 410 can comprise depositing a reagent into the first zone 120. For example, the reagent can be placed over the first zone and then the cell 105 is electrowetted so that the reagent enters the first zone 120. Alternatively, the regent can be delivered directly into the first zone 120 using a micro-volume delivery device, such as a micro-pipette. In still other instances, the analytical depot 410 can be formed by fabricating a field-effect transistor (FET) using conventional process well-known to those in the semiconductor industry. In some cases the FET is located in the first zone 120. The FET can be configured to generate an electrical signal when it comes in contact with a particular type of fluid 200 or material of interest dissolved or suspended in the fluid 200.

Although the present invention has been described in detail, those of ordinary skill in the art should understand that they can make various changes, substitutions and alterations herein without departing from the scope of the invention.

What is claimed is:

1. An apparatus, comprising:

a plurality of closed-cells on a substrate surface, each of said closed cells having external walls that enclose an open interior area on all sides except for the side over which a liquid could be disposed, while being in contact with top surfaces of one or more of said walls, and wherein:

each of said closed-cells comprise one or more internal walls that divide said interior area of each of said closed-cells into a single centrally located first zone and a plurality of second zones that define said central first zone, said first zone occupies a larger portion of said interior area of said closed-cell than any one of said second zones, said first and second zones are interconnected to form a common volume among said first zone and said plurality of said second zones of said closed cell, said plurality of second zones are located proximate to said external walls of said closed-cell and, said first zone occupies a portion of the interior area that is at least about two times larger than said interior area occupied by any one of said second zones.

2. The apparatus of claim 1, wherein each said closed-cells have at least one dimension that is less than about 1 millimeter.

3. The apparatus of claim 1, wherein at least one lateral dimension of said first zone is less than a capillary length of said liquid locatable on said closed-cells.

4. The apparatus of claim 1, wherein a lateral width of each of said closed-cells range from about 10 microns to about 1 millimeter and a height of each of said closed-cells range about 5 microns to about 50 microns.

5. An apparatus, comprising:

a plurality of closed-cells on a substrate surface, each of said closed cells having external walls that enclose an open interior area on all sides except for the side over which a liquid could be disposed, while being in contact with top surfaces of one or more of said walls, and wherein:

each of said closed-cells comprise one or more internal walls that divide said interior area of each of said closed-cells into a single first zone and a plurality of second zones, said first zone occupies a larger portion of said interior area of said closed-cell than any one of said second zones, said first and second zones are interconnected to form a common volume among said first zone and said plurality of said second zones of said closed cell, and said plurality of second zones comprise open cells and said open cells include a single continuous internal wall that encloses a different portion of the interior area within the closed cell on all but one lateral side, and the side over which the fluid could be disposed.

6. The apparatus of claim 1, wherein said plurality of closed-cells form a network of interconnected cells wherein adjacent closed-cells share a portion at least one external wall.

7. The apparatus of claim 1, further comprising a temperature-regulating device thermally coupled to said plurality of closed-cells, said temperature-regulating device configured to heat or cool a medium locatable in said closed-cells.

8. The apparatus of claim 7, wherein said temperature-regulating device is configured to change a temperature of said medium ranging from a freezing point to a boiling point of said liquid locatable on said closed-cells.

9. The apparatus of claim 1, further comprising an electrical source that is electrically coupled to said plurality of closed-cells, said electrical source configured to apply a current to said plurality of closed-cells, thereby heating a medium locatable in said closed-cells.

10. The apparatus of claim 1, further comprising an electrical source that is electrically coupled to said plurality of closed-cells and to said liquid located on said plurality of closed-cells, said electrical source configured to apply a voltage between said plurality of closed-cells and said liquid.

11. A method comprising, reversibly controlling a contact angle of a liquid disposed on a substrate surface, comprising:

placing said liquid on a plurality closed-cells of said substrate surface, each of said closed cells having walls that enclose an open area on all sides except for the side over which said liquid could be disposed, while contacting top surfaces of one or more of said walls, and wherein each of said closed-cells comprise one or more internal walls that divide an interior of each of said closed-cells into a single first zone and a plurality of second zones, wherein said first zone occupies a larger area of said closed-cell than any one of said second zones and wherein said first and second zones are interconnected to form a common volume; and adjusting a pressure of a medium located inside at least one of said closed-cells, thereby changing said contact angle of said liquid with said substrate surface.

12. The method of claim 11, wherein said contact angle can be reversibly changed by at least about 1° per degree Celsius change in a temperature of said medium.

13. The method of claim 11, wherein said contact angle can be reversibly changed by about 50° for a 70 degree Celsius change in a temperature of said medium.

14. The method of claim 11, wherein an increase in said pressure causes said contact angle to increase and a decrease in said pressure causes said contact angle to decrease.

15. The method of claim 11, wherein said pressure is adjusted by increasing or decreasing a temperature of said medium.

16. The method of claim 11, wherein said pressure is adjusted by increasing a temperature of said medium by applying a current to said closed-cell.

17. A method of manufacturing an apparatus, comprising:

forming a plurality of closed-cells on a surface of a substrate, each of said closed cells having walls that enclose an open interior area on all sides except for the side over which a liquid could be disposed, while being in contact with top surfaces of one or more of said walls, and wherein:

each of said closed-cells comprise one or more internal walls that divide said interior area of each of said closed-cells into a single first zone and a plurality of second zones, said first zone occupies a larger portion of said interior area of said closed-cell than any one of said second zones, and said first and second zones are interconnected to form a common volume among said first zone and said plurality of said second zones of said closed cell.

18. The method of claim 1, wherein a lateral thickness of said one of more of said internal walls is about 1 millimeter or less.

19. The method of claim 11, wherein a decrease in said pressure causes said liquid to be drawn into said first zone but not into said plurality of second zones.

* * * * *